United States Patent
Wada et al.

(10) Patent No.: US 9,984,799 B2
(45) Date of Patent: May 29, 2018

(54) FERRITE COMPOSITION AND ELECTRONIC COMPONENT

(71) Applicant: TDK CORPORATION, Tokyo (JP)

(72) Inventors: Ryuichi Wada, Tokyo (JP); Kouichi Kakuda, Tokyo (JP); Hiroki Choto, Tokyo (JP); Yukari Akita, Tokyo (JP); Yukio Takahashi, Tokyo (JP); Masahiro Endo, Tokyo (JP); Takashi Suzuki, Tokyo (JP); Takahiro Sato, Tokyo (JP); Akinori Ohi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 227 days.

(21) Appl. No.: 14/507,216

(22) Filed: Oct. 6, 2014

(65) Prior Publication Data

US 2015/0097137 A1    Apr. 9, 2015

(30) Foreign Application Priority Data

Oct. 7, 2013  (JP) ................. 2013-210515

(51) Int. Cl.
*H01F 1/34* (2006.01)
*H01F 1/01* (2006.01)
(Continued)

(52) U.S. Cl.
CPC ............ *H01F 1/01* (2013.01); *C04B 35/26* (2013.01); *C04B 35/62645* (2013.01); *H01F 1/344* (2013.01); *H01F 27/255* (2013.01); *C04B 2235/3275* (2013.01); *C04B 2235/3277* (2013.01); *C04B 2235/3279* (2013.01); *C04B 2235/3281* (2013.01); *C04B 2235/3284* (2013.01); *C04B 2235/3298* (2013.01); *C04B 2235/3418* (2013.01); *C04B 2235/77* (2013.01); *H01F 3/08* (2013.01); *H01F 17/0013* (2013.01); *H01F 17/04* (2013.01); *H01F 38/14* (2013.01)

(58) Field of Classification Search
CPC . H01F 1/34; H01F 1/342; H01F 1/344; H01F 1/348
USPC .................. 252/62.59, 62.62, 62.6
See application file for complete search history.

(56) References Cited

U.S. PATENT DOCUMENTS

2011/0226982 A1    9/2011 Wada et al.

FOREIGN PATENT DOCUMENTS

JP    01-101609    *    4/1989
JP    H01-101609 A    4/1989
(Continued)

OTHER PUBLICATIONS

Hidekazu. JP H05-326243 machine translation. Courtesy of the JPO. Retrieved on Aug. 17, 2016.*

Primary Examiner — Matthew E Hoban
(74) Attorney, Agent, or Firm — Oliff PLC

(57) ABSTRACT

A ferrite composition comprises a main component and a sub component. The main component is comprised of 25.0 to 49.8 mol % iron oxide in terms of $Fe_2O_3$, 5.0 to 14.0 mol % copper oxide in terms of CuO, 0 to 40.0 mol % zinc oxide in terms of ZnO, and a remaining part of nickel oxide. The sub component includes 0.2 to 5.0 wt % silicon oxide in terms of $SiO_2$, 0.10 to 3.00 wt % bismuth oxide in terms of $Bi_2O_3$, and 0.10 to 3.00 wt % cobalt oxide in terms of $Co_3O_4$, with respect to the main component.

6 Claims, 6 Drawing Sheets

(51) Int. Cl.
*H01F 27/255* (2006.01)
*C04B 35/26* (2006.01)
*C04B 35/626* (2006.01)
*H01F 38/14* (2006.01)
*H01F 3/08* (2006.01)
*H01F 17/00* (2006.01)
*H01F 17/04* (2006.01)

(56) References Cited

FOREIGN PATENT DOCUMENTS

| | | | |
|---|---|---|---|
| JP | H02-137301 A | | 5/1990 |
| JP | H03-218962 A | | 9/1991 |
| JP | H05-326243 A | | 12/1993 |
| JP | H08-325056 A | | 12/1996 |
| JP | 2001-348226 A | | 12/2001 |
| JP | 2004-296865 A | | 10/2004 |
| JP | 2008-130736 A | | 6/2008 |
| JP | 4369936 | * | 11/2009 |
| JP | 2013-060332 A | | 4/2013 |
| KR | 10-2011-0104441 A | | 9/2011 |

* cited by examiner

FERRITE COMPOSITION AND ELECTRONIC COMPONENT

BACKGROUND OF THE INVENTION

1. Field of the Invention

The present invention relates to a ferrite composition suitable for manufacture of multilayer inductors for example and an electronic component having a ferrite sintered body composed of the composition.

2. Description of the Related Art

Development of mobile devices such as smart phones with high performance is remarkably advancing. In recent years, NFC (Near field communication) and non-contact power supply etc. are being adopted, and circuits flowing higher AC currents than those of conventional ones are increasing.

Also, due to response to high densification of electronic components, downsizing of the components is still strongly requested. Generally, with respect to inductance elements, Q values tend to decrease when AC currents increase or they are downsized. For such circumstances, magnetic core materials enabling high Q values even under increase of AC current values or downsizing thereof are required as well as inductance elements using the materials.

Note that, Patent Document 1 discloses magnetic materials having excellent anti-stress characteristic by adding $SiO_2$ and CoO to NiCuZn ferrites. However, the magnetic materials of Patent Document 1 are materials which are sintered 1050° C. or higher. Further, Patent Document 1 does not disclose Q values under high amplitude currents.

Also, Patent Document 2 discloses ferrite materials having a small magnetic loss even under high amplitude currents by adding cobalt oxide to NiCuZn ferrites. However, in recent years, ferrite materials having higher performance than the ferrite materials disclosed in Patent Document 2 are being requested.

Further, in multilayer inductors, coil conductors and ferrite layers are required to be fired integrally. Thus, ferrite compositions for the multilayer inductors are required to have a sintering temperature which is the same or lower than the melting point of the coil conductors.

[Patent Document 1] JP Patent Application Laid Open No. H02-137301

[Patent Document 2] JP Patent Application Laid Open No. 2013-060332

SUMMARY OF THE INVENTION

Therefore, the present invention was made considering the above situations; and its object is to provide a ferrite composition enabling low temperature sintering and having high Q values under high magnetic fields and a small deterioration in the Q values under high amplitude currents and to provide an electronic component enabling downsizing.

In order to achieve such object, a ferrite composition according to the present invention comprises a main component and a sub component, wherein said main component is comprised of 25.0 to 49.8 mol % iron oxide in terms of $Fe_2O_3$, 5.0 to 14.0 mol % copper oxide in terms of CuO, 0 to 40.0 mol % zinc oxide in terms of ZnO, and a remaining part of nickel oxide, and said sub component includes 0.2 to 5.0 wt % silicon oxide in terms of $SiO_2$, 0.10 to 3.00 wt % bismuth oxide in terms of $Bi_2O_3$, and 0.10 to 3.00 wt % cobalt oxide in terms of $Co_3O_4$, with respect to the main component 100 wt %.

An electronic component according to the present invention comprises a ferrite sintered body composed of the above ferrite composition.

In the ferrite composition according to the present invention, the contents of the oxides comprising the main component are set in the above range, and further silicon oxide, bismuth oxide, and cobalt oxide are included in the above range as the sub component, which enables low temperature sintering. For example, the ferrite composition can be sintered at about 900° C., which is lower than the melting point of Ag available for inner electrodes. Also, the ferrite sintered body composed of the ferrite composition according to the present invention has a small lowering rate of Q even if an exterior magnetic field is increased, Q values larger than those of the conventional one, and small deterioration in the Q values under high amplitude currents.

Further, the ferrite sintered body composed of the ferrite composition according to the present invention can increase Q values even under magnetic fields higher than conventional ones. That is, for example, even under high external magnetic fields (tens to hundreds A/m) compared with conventional external magnetic fields (1 to 2 A/m), sufficiently high Q values are maintained. Therefore, the electronic components according to the present invention can be used for large amplitude signals compared with electronic components having ferrite sintered bodies composed of the conventional ferrite compositions.

Also, the ferrite sintered body composed of the ferrite compositions according to the present invention has a low loss and high Q values even if AC currents higher than conventional ones are applied. Therefore, by using the ferrite compositions according to the present invention, ferrite layers can be thinned and electronic components can be downsized.

It is considered that the reason why such effects can be obtained is composite effects obtained by setting the main component in the predetermined range and further setting each content of the sub component in a specific range.

Note that, the ferrite sintered body composed of the ferrite compositions according to the present invention is preferable for such as multilayer inductors, multilayer L-C filters, multilayer common mode filters, and composite electronic components made by multilayer methods or so. For example, the ferrite sintered body is also preferably used for LC composite electronic components and NFC coils etc. In particular, when µ is 80 or less, the ferrite sintered body is preferably used for usage of the NFC coils (e.g. 13.56 MHz) used in high frequency bands, high-frequency multilayer power inductors (e.g. 20 to 200 MHz), or multilayer beads etc., for example. Also, when µ is more than 80, the ferrite sintered body is preferably used for usage of multilayer power inductors (e.g. 1 to 20 MHz) or small signal inductors etc.

The ferrite sintered body composed of the ferrite compositions according to the present invention has a small lowering rate of Q even if the exterior magnetic field is increased and large Q values. Since the ferrite sintered body composed of such ferrite compositions has no deterioration in characteristic under a large amplitude signal, electronic components can be downsized.

DESCRIPTION OF THE PREFERRED EMBODIMENTS

Figure 1:
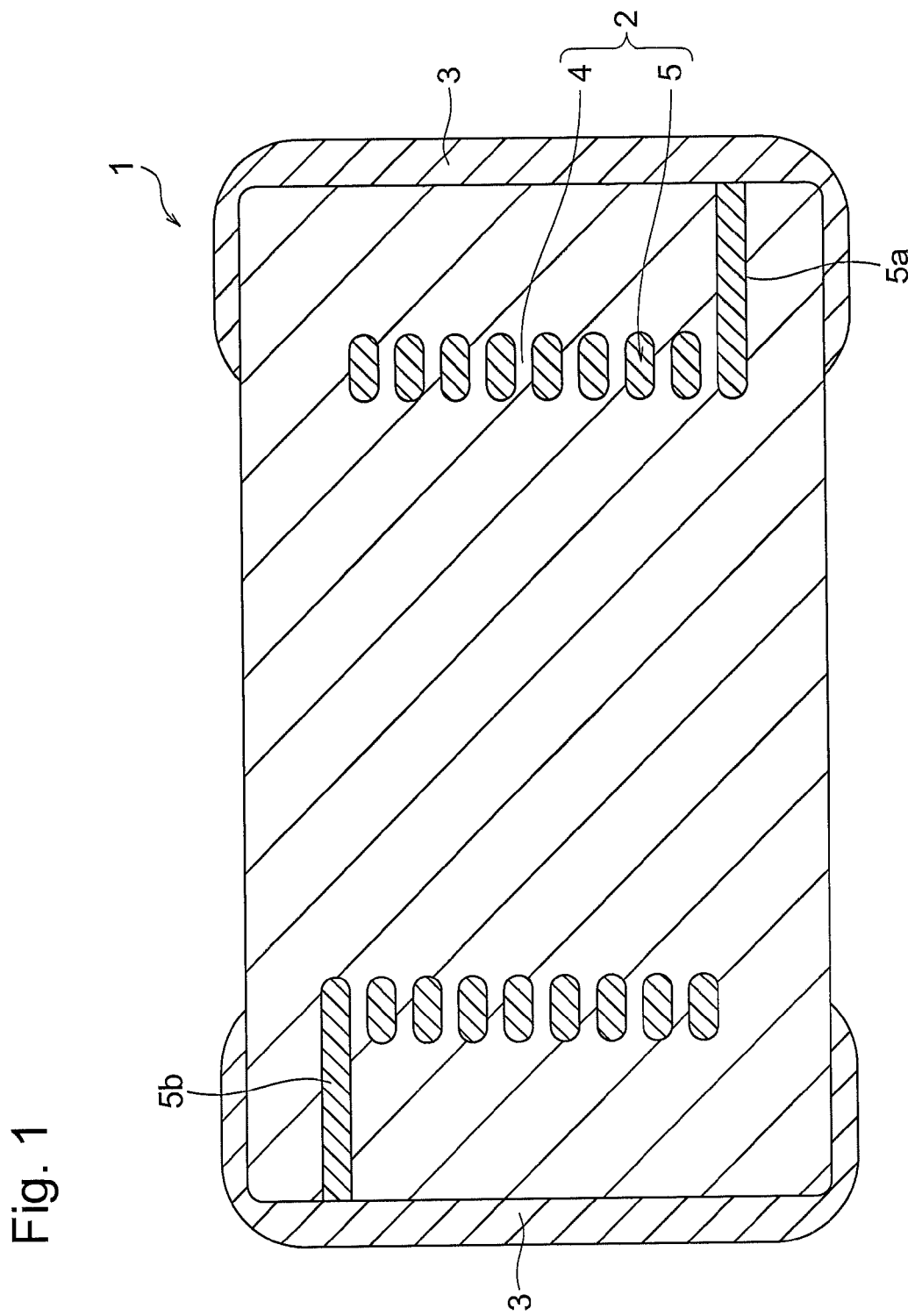
FIG. 1 is a cross-sectional view of a multilayer inductor according to one embodiment of the present invention.

Hereinafter, the present invention will be described based on embodiments shown in the drawings.

As shown in FIG. 1, a multilayer inductor 1 according to one embodiment of the present invention has an element 2 and terminal electrodes 3. The element 2 is obtained by firing a green multilayer body in which coil conductors 5 are formed three-dimensionally and spirally via ferrite layers 4. The ferrite layers 4 are composed of a ferrite composition according to one embodiment of the present invention. The multilayer inductor 1 is obtained by forming the terminal electrodes 3 at both sides of the element 2 to connect the terminal electrodes 3 with leading electrodes 5a and 5b. A shape of the element 2 is not particularly limited, but it is usually rectangular parallelepiped one. Also, the size thereof is not particularly limited, either. A proper size can be adopted based on usage.

Materials of the coil conductors 5 and the leading electrodes 5a and 5b are not particularly limited, and Ag, Cu, Au, Al, Pd, or Pd/Ag alloy etc. is used. Note that, Ti compound, Zr compound, or Si compound etc. may be added.

The ferrite composition according to the present embodiment is Ni—Cu ferrite or Ni—Cu—Zn ferrite. The main component thereof may include iron oxide, copper oxide, and nickel oxide, or may further include zinc oxide.

In the main component 100 mol %, in terms of $Fe_2O_3$, a content of iron oxide is 25.0 to 49.8 mol %, preferably 30.0 to 48.0 mol %, and more preferably 34.0 to 48.0 mol %. When the content of iron oxide is too large or too small, sinterability deteriorates and, in particular, sintered density after low temperature sintering tends to decrease.

In the main component 100 mol %, in terms of CuO, a content of copper oxide is 5.0 to 14.0 mol %, preferably 7.0 to 12.0 mol %, and more preferably 7.0 to 11.0 mol %. When the content of copper oxide is too small, sinterability deteriorates and, in particular, sintered density after low temperature sintering tends to decrease. When the content of copper oxide is too large, Q value tends to decrease.

In the main component 100 mol %, in terms of ZnO, a content of zinc oxide is 0 to 40.0 mol %. That is, zinc oxide may not be included as the main component. When zinc oxide is included as the main component, the content of zinc oxide is preferably 0.5 to 32.0 mol % and more preferably 1.0 to 30.0 mol %. When the content of zinc oxide is too large, Curie temperature tends to decrease.

A remaining part of the main component is comprised of nickel oxide.

In addition to the above main component, the ferrite composition according to the present embodiment includes a sub component such as silicon oxide, bismuth oxide, and cobalt oxide.

With respect to the main component 100 wt %, in terms of $SiO_2$, a content of silicon oxide is 0.2 to 5.0 wt %, preferably 0.25 wt % to 4.0 wt %, and more preferably 0.5 to 4.0 wt %. When the content of silicon oxide is too small, Q value tends to decrease and a lowering rate of Q tends to increase. When the content of silicon oxide is too large, sinterability deteriorates and, in particular, sintered density after low temperature sintering tends to decrease.

With respect to the main component 100 wt %, in terms of $Bi_2O_3$, a content of bismuth oxide is 0.10 to 3.00 wt % and preferably 0.20 to 2.00 wt %. When the content of bismuth oxide is too small, sinterability deteriorates and, in particular, sintered density after low temperature sintering tends to decrease. When the content of bismuth oxide is too large, Q value tends to decrease and a lowering rate of Q tends to increase.

With respect to the main component 100 wt %, in terms of $Co_3O_4$, a content of cobalt oxide is 0.10 to 3.00 wt % and preferably 0.20 to 2.00 wt %. When the content of cobalt oxide is too small, Q value tends to decrease and a lowering rate of Q tends to increase. When the content of cobalt oxide is too large, sinterability deteriorates and, in particular, sintered density after low temperature sintering tends to decrease.

In the ferrite composition according to the present embodiment, in addition that a composition range of the main component is controlled in the above range, the above silicon oxide, bismuth oxide, and cobalt oxide are always included as the sub component. As a result, it is possible to decrease sintering temperature and use a metal such as Ag having a relatively low melting point as an integrally fired inner conductor. Further, a ferrite sintered body sintered at low temperature has a small lowering rate of Q value and maintains a characteristic where Q value is high.

Note that, with respect to silicon oxide, bismuth oxide, and cobalt oxide, when any one or more thereof is not included, the above effects cannot be obtained adequately. That is, it is considered that the above effects are composite effects which can be obtained only when silicon oxide, bismuth oxide, and cobalt oxide are included by a certain amount at the same time.

Also, in the ferrite composition according to the present embodiment, in addition to the above sub component, additional components such as manganese oxide like $Mn_3O_4$, zirconium oxide, and glass compound may be further included in a range where the effects of the present invention are not disturbed. A content of the additional components is not particularly limited, and it is approximately 0.05 to 1.0 wt %, for example.

Further, the ferrite composition according to the present embodiment may include an oxide of inevitable impurity element.

Specifically, as the inevitable impurity element, C, S, Cl, As, Se, Br, Te and I, a typical metal element such as Li, Na, Mg, Al, Ca, Ga, Ge, Sr, Cd, In, Sb, Ba and Pb, and a transition metal element such as Sc, Ti, V, Cr, Y, Nb, Mo, Pd, Ag, Hf and Ta are exemplified. Also, the oxide of the inevitable impurity element may be included in the ferrite composition as far as the content thereof is approximately 0.05 wt % or less.

The ferrite composition according to the present embodiment has ferrite particles and crystal grain boundaries present among adjacent crystal particles. An average crystal particle diameter of the crystal particles is preferably 0.2 to 1.5 μm.

Next, an example of a method for manufacturing the ferrite composition according to the present embodiment will be described. First, starting materials (a material of the main component and a material of the sub component) are mixed after they are weighted so as to satisfy a predetermined composition ratio, and a raw material mixture is obtained. As a mixing method, for example, wet mixing using a ball mill and dry mixing using a dry mixer can be raised. Note that, it is preferable to use a starting material having an average particle diameter of 0.05 to 1.0 μm.

As a material of the main component, iron oxide ($\alpha$-$Fe_2O_3$), copper oxide (CuO), nickel oxide (NiO), zinc oxide (ZnO) if necessary, or composite oxide etc. can be used. Further, other various compounds to become the above oxides and composite oxides after firing can be used. As examples to become the above oxides after firing, a metal alone, carbonate, oxalate, nitrate, hydroxide, halogenide, and organometallic compound etc. can be exemplified.

As a material of the sub component, silicon oxide, bismuth oxide, and cobalt oxide can be used. The oxide to become the material of the sub component is not particularly limited, and a composite oxide or so can be used. Further, other various compounds to become the above oxides and composite oxides after firing can be used. As examples to become the above oxides after firing, a metal alone, carbonate, oxalate, nitrate, hydroxide, halogenide, and organometallic compound etc. can be exemplified.

Note that, $Co_3O_4$, which is an example of cobalt oxide, is preferable as a material of cobalt oxide. This is because it is easy to store and handle and valence thereof is stable even in the air.

Next, the raw material mixture is calcined and a calcined material is obtained. Calcination is performed so as to induce thermal decomposition of the raw material, homogeneity of components, generation of the ferrite, disappearance of ultrafine powder by sintering, and particle growth to a proper particle size and to convert the raw material mixture to a form suitable for the following process. Such a calcination is preferably performed at a temperature of 650 to 750° C. for 2 to 15 hours in general. Calcination is usually performed under the atmosphere (air), but it may be performed under an atmosphere where an oxygen partial pressure is lower than that of the atmosphere. Note that, the mixing of the material of the main component and the material of the sub component may be performed before the calcination or after it.

Next, the calcined material is pulverized to obtain a pulverized material. Pulverization is performed to disconnect an aggregation so that the calcined material becomes powders having a proper sinterability. When the calcined material forms large lumps, wet pulverization is performed by using a ball mill or an attritor etc. after performing coarse pulverization. The wet pulverization is performed until an average particle diameter of the pulverized material becomes preferably 0.1 to 1.0 μm or so.

By using the obtained pulverized material, a multilayer inductor according to the present embodiment is manufactured. A method for manufacturing the multilayer inductor is not limited, but hereinafter, a sheet method is used.

First, the obtained pulverized material is slurried with an additive such as solvent and binder, and a paste is produced. Then, green sheets are formed by using the paste. Next, through transforming the formed green sheets to a predetermined shape and performing a debinding step and a firing step, the multilayer inductor according to the present embodiment is obtained. The firing is performed at a temperature which is the same or lower than the melting point of the coil conductor 5 and the leading electrodes 5a and 5b. For example, when the coil conductor 5 and the leading electrodes 5a and 5b are Ag (melting point: 962° C.), the firing is preferably performed at 850 to 920° C. The firing is usually performed for 1 to 5 hours or so. Also, the firing may be performed in the atmosphere (air) or may be performed under an atmosphere where an oxygen partial pressure is lower than that of the atmosphere. The multilayer inductor obtained as this way is comprised of the ferrite composition according to the present embodiment.

Figure 2:
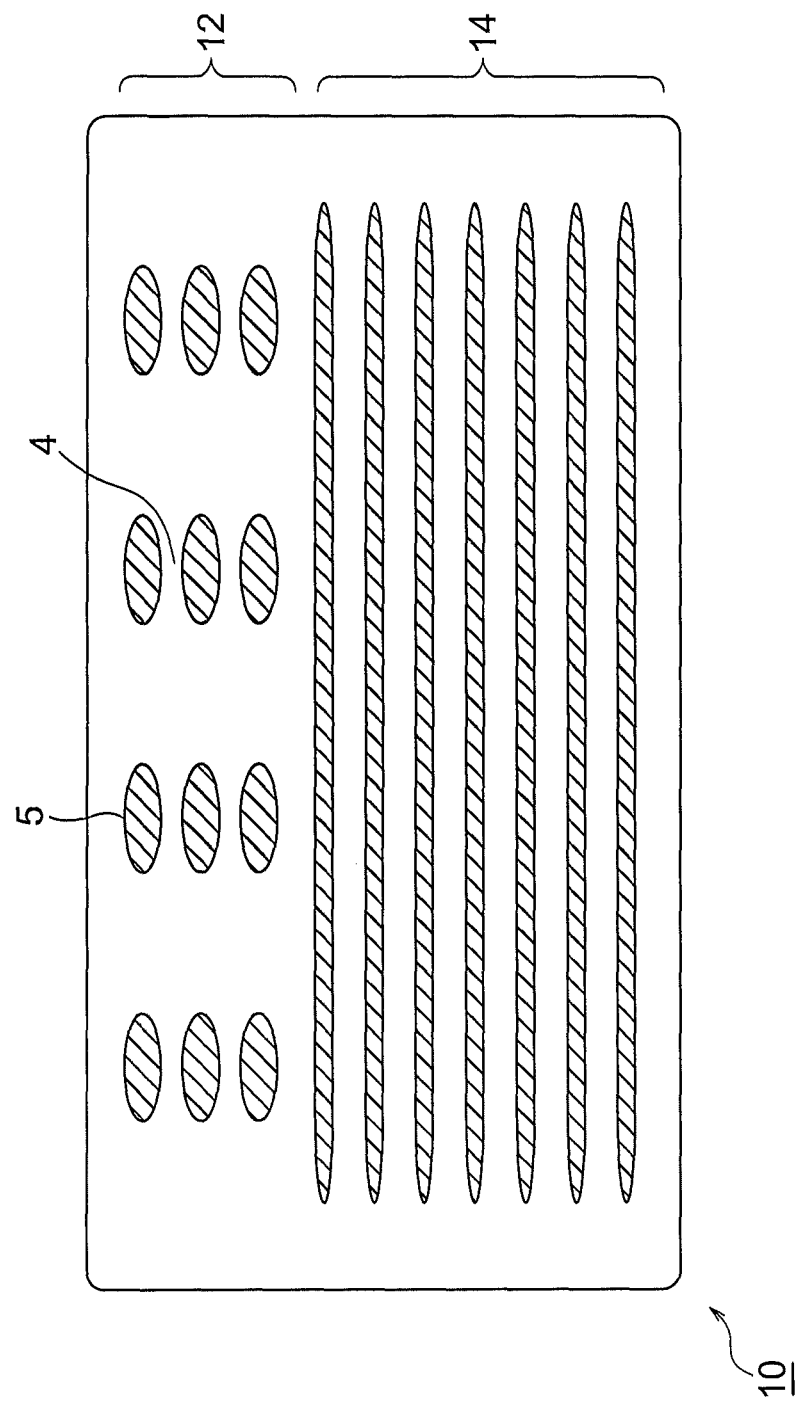
FIG. 2 is a cross-sectional view of a LC composite electronic component according to one embodiment of the present invention.

Up to here, the embodiment of the present invention was described, but the present invention is not limited to the embodiment. Needless to say, the present invention can be performed by various embodiments in a range where the points of the present invention are not deviated. For example, as the ferrite layers 4 of the LC composite electronic component 10 shown in FIG. 2, the ferrite composition of the present invention may be used. Note that, in FIG. 2, a part shown by sign 12 is an inductor part, and a part shown by sign 14 is a capacitor part.

Hereinafter, the present invention will be described based on more detailed examples, but the present invention is not limited to the examples.

Example 1

First, as materials of the main component, $Fe_2O_3$, NiO, CuO, and ZuO (when zinc oxide was included) were prepared. As materials of the sub component, $SiO_2$, $Bi_2O_3$, and $Co_3O_4$ were prepared.

Next, after powders of the prepared main component and sub component were weighted so that they satisfied the composition described in Tables 1 and 2 as sintered bodies, they were wet mixed for 16 hours in a ball mill, and a raw material mixture was obtained.

Next, after the obtained raw material mixture was dried, it was calcined for 4 hours at 720° C. in the air, and the calcined powders were obtained. The pulverized powders were obtained by wet pulverizing the calcined powders for 72 hours in a steel ball mill.

Next, after drying the pulverized powders, granulation was performed by adding 10.0 wt % of a polyvinyl alcohol solution as a binder having 6 wt % concentration into the pulverized powder 100 wt % so as to obtain granules. The granules were molded by pressure so as to satisfy a molding density of 3.20 $Mg/m^3$, and toroidal-shaped (size=outer diameter 13 mm×inner diameter 6 mm×height 3 mm) molded bodies were obtained.

Next, each of the molded bodies were fired for 2 hours at 900° C., which is below the melting point of Ag (962° C.), in the air. Then, toroidal core samples as sintered bodies were obtained. Further, the following characteristic evaluations were performed on the samples.

Sintered Density

With respect to the obtained toroidal core samples, a sintered density was calculated from a size and weight of the sintered body after firing. In the present example, a sintered density of 5.0 $Mg/m^3$ or more was considered as good. Also, with respect to samples having a sintered density of less than 5.0 $Mg/m^3$, the following characteristic evaluations were omitted because other characteristic evaluations were considered as not worthy of being performed.

Curie Temperature

A curie temperature was measured based on JIS-C-2560-1. In the present example, the evaluations were performed by whether the Curie temperature was 125° C. or higher. With respect to samples whose Curie temperature was less than 125° C., the following characteristic evaluations were omitted because other characteristic evaluations were considered as not worthy of being performed due to inconvenience in an operating temperature of the inductor.

Permeability μ, Q Value and Lowering Rate of Q

With respect to samples having good sintered density and Curie temperature, primary and secondary sides thereof were wound by copper wires with 20 turns and 7 turns, respectively. Permeability μ and Q values were measured by using B-H Analyzer (IWATSU TEST INSTRUMENTS CORPORATION, B-H ANALYZER SY-8218) and AMPLIFIER (NF CORPORATION, HIGH SPEED BIPORLAR AMPLIFIER HSA 4101-IW). As the measuring conditions, measuring frequency was 1 MHz, measuring temperature was 25° C., and external magnetic fields were applied by 100 A/m and 200 A/m. Further, from the measured Q values, lowering rates of Q were calculated when the exterior magnetic field was increased from 100 A/m to 200 A/m.

In the present example, it is preferable that the lowering rate of Q is 45% or lower when the exterior magnetic field was increased from 100 A/m to 200 A/m. Further, it is preferable that Q value is 120 or higher when the external magnetic field is 100 A/m and μ is 80 or smaller. Further, when the external magnetic field is 200 A/m and μ is 80 or smaller, Q value is preferably 100 or larger. The above results are shown in Table 1 (Example) and Table 2 (Comparative Example). Also, samples where cells of Curie temperature show ○ represent that Curie temperature is 125° C. or higher, and the sample where a cell of Curie temperature shows x represents that Curie temperature is less than 125° C.

TABLE 1

| Sample Number | Main Component (mol %) | | | Sub Component (wt %) | | | Sintered Density (Mg/m³) 900° C. | Curie Temperature | μ at 100 A/m | Q at 100 A/m | μ at 200 A/m | Q at 200 A/m | Lowering Rate of Q % |
|---|---|---|---|---|---|---|---|---|---|---|---|---|---|
| | $Fe_2O_3$ | CuO | ZnO | $SiO_2$ | $Bi_2O_3$ | $Co_3O_4$ | | | | | | | |
| 1 | 47.0 | 9.0 | 24.0 | 0.3 | 0.10 | 0.30 | 5.25 | ○ | 148 | 47 | 158 | 31 | 33 |
| 2 | 47.0 | 9.0 | 24.0 | 0.2 | 0.20 | 0.50 | 5.26 | ○ | 139 | 53 | 145 | 43 | 19 |
| 3 | 47.0 | 9.0 | 24.0 | 0.5 | 0.30 | 0.15 | 5.27 | ○ | 125 | 80 | 140 | 45 | 44 |
| 4 | 47.0 | 9.0 | 30.0 | 1.0 | 0.30 | 0.24 | 5.27 | ○ | 138 | 88 | 144 | 55 | 38 |
| 5 | 47.0 | 9.0 | 26.0 | 1.4 | 0.50 | 0.20 | 5.18 | ○ | 93 | 129 | 96 | 70 | 45 |
| 6 | 49.0 | 11.0 | 20.0 | 1.6 | 0.50 | 0.20 | 5.19 | ○ | 66 | 125 | 67 | 103 | 18 |
| 7 | 47.0 | 9.0 | 24.0 | 1.8 | 0.20 | 0.20 | 5.08 | ○ | 46 | 138 | 47 | 103 | 25 |
| 8 | 47.0 | 9.0 | 24.0 | 1.8 | 0.30 | 0.25 | 5.14 | ○ | 47 | 154 | 49 | 116 | 24 |
| 9 | 47.0 | 9.0 | 24.0 | 2.5 | 3.00 | 1.50 | 5.23 | ○ | 28 | 164 | 28 | 143 | 13 |
| 10 | 47.0 | 9.0 | 24.0 | 4.0 | 1.50 | 0.80 | 5.04 | ○ | 12 | 148 | 12 | 139 | 6 |
| 11 | 47.0 | 9.0 | 24.0 | 5.0 | 1.50 | 0.15 | 5.12 | ○ | 13 | 165 | 13 | 161 | 3 |
| 12 | 47.0 | 9.0 | 24.0 | 5.0 | 3.00 | 0.15 | 5.19 | ○ | 11 | 153 | 11 | 150 | 2 |
| 21 | 47.0 | 9.0 | 24.0 | 1.8 | 0.30 | 0.10 | 5.23 | ○ | 50 | 143 | 52 | 124 | 14 |
| 22 | 47.0 | 9.0 | 24.0 | 1.6 | 1.50 | 2.00 | 5.22 | ○ | 33 | 169 | 34 | 148 | 12 |
| 23 | 47.0 | 9.0 | 24.0 | 1.8 | 0.30 | 0.50 | 5.11 | ○ | 44 | 167 | 46 | 143 | 14 |
| 24 | 47.0 | 9.0 | 24.0 | 1.8 | 0.30 | 0.85 | 5.12 | ○ | 42 | 189 | 44 | 152 | 20 |
| 25 | 48.0 | 9.0 | 26.0 | 1.8 | 0.30 | 1.00 | 5.03 | ○ | 59 | 131 | 60 | 126 | 4 |
| 26 | 49.0 | 9.0 | 28.0 | 1.8 | 0.30 | 1.00 | 5.03 | ○ | 79 | 148 | 80 | 117 | 20 |
| 27 | 45.0 | 9.0 | 24.0 | 1.8 | 0.50 | 1.20 | 5.04 | ○ | 38 | 175 | 40 | 140 | 20 |
| 28 | 45.0 | 9.0 | 24.0 | 1.8 | 0.50 | 1.60 | 5.03 | ○ | 30 | 170 | 30 | 164 | 4 |
| 29 | 45.0 | 9.0 | 24.0 | 1.6 | 1.50 | 3.00 | 5.08 | ○ | 28 | 134 | 28 | 105 | 22 |
| 31a | 25.0 | 9.0 | 10.0 | 1.4 | 3.00 | 3.00 | 5.21 | ○ | 2 | 149 | 2 | 143 | 4 |
| 31b | 30.0 | 9.0 | 6.0 | 1.2 | 0.80 | 1.50 | 5.22 | ○ | 8 | 149 | 8 | 128 | 14 |
| 31c | 49.8 | 9.0 | 10.0 | 1.4 | 1.00 | 1.00 | 5.31 | ○ | 16 | 160 | 16 | 157 | 2 |
| 31d | 40.0 | 9.0 | 23.0 | 2.0 | 1.00 | 1.60 | 5.26 | ○ | 11 | 153 | 11 | 131 | 14 |
| 31e | 38.0 | 5.0 | 10.0 | 1.4 | 1.00 | 1.00 | 5.02 | ○ | 12 | 147 | 13 | 137 | 7 |
| 31f | 32.0 | 12.0 | 6.0 | 1.2 | 0.80 | 1.50 | 5.18 | ○ | 9 | 152 | 9 | 117 | 23 |
| 31g | 34.0 | 14.0 | 10.0 | 1.4 | 1.00 | 1.00 | 5.21 | ○ | 13 | 164 | 14 | 119 | 27 |
| 31h | 34.0 | 9.0 | 0.0 | 1.4 | 1.00 | 1.00 | 5.23 | ○ | 3 | 154 | 4 | 153 | 1 |
| 31i | 32.0 | 9.0 | 0.5 | 1.2 | 0.80 | 1.50 | 5.25 | ○ | 3 | 162 | 3 | 159 | 2 |
| 31j | 34.0 | 7.0 | 1.0 | 1.4 | 1.00 | 1.00 | 5.00 | ○ | 4 | 185 | 5 | 179 | 3 |
| 31k | 34.0 | 10.0 | 3.0 | 1.4 | 1.00 | 1.00 | 5.24 | ○ | 7 | 179 | 8 | 153 | 14 |
| 31l | 39.0 | 9.0 | 32.0 | 1.2 | 0.80 | 1.50 | 5.18 | ○ | 15 | 162 | 15 | 128 | 21 |
| 31m | 40.0 | 9.0 | 40.0 | 1.8 | 1.00 | 1.00 | 5.12 | ○ | 18 | 174 | 18 | 139 | 20 |

TABLE 2

| Sample Number | Main Component (mol %) | | | Sub Component (wt %) | | | Sintered Density 900° C. | Curie Temperature | μ at 100 A/m | Q at 100 A/m | μ at 200 A/m | Q at 200 A/m | Lowering Rate of Q % |
|---|---|---|---|---|---|---|---|---|---|---|---|---|---|
| | $Fe_2O_3$ | CuO | ZnO | $SiO_2$ | $Bi_2O_3$ | $Co_3O_4$ | | | | | | | |
| 41 | 48.0 | 8.0 | 3.0 | 0.0 | 0.00 | 0.00 | 5.28 | ○ | 29 | 47 | 30 | 25 | 46 |
| 42 | 47.0 | 8.0 | 7.0 | 0.0 | 0.00 | 1.00 | 5.12 | ○ | 28 | 105 | 28 | 88 | 15 |
| 43 | 47.0 | 9.0 | 12.0 | 1.8 | 1.00 | 0.00 | 5.28 | ○ | 28 | 62 | 29 | 38 | 40 |
| 51 | 47.0 | 9.0 | 22.0 | 0.1 | 0.30 | 0.30 | 5.24 | ○ | 145 | 19 | 159 | 8 | 58 |
| 52 | 47.0 | 9.0 | 30.0 | 7.0 | 1.00 | 0.15 | 4.60 | — | — | — | — | — | — |
| 53 | 47.0 | 9.0 | 24.0 | 1.0 | 0.05 | 0.15 | 4.80 | — | — | — | — | — | — |
| 54 | 47.0 | 9.0 | 24.0 | 1.0 | 5.00 | 0.15 | 5.31 | ○ | 81 | 80 | 82 | 42 | 48 |
| 55 | 47.0 | 9.0 | 24.0 | 1.0 | 0.30 | 0.05 | 5.32 | ○ | 106 | 42 | 112 | 18 | 57 |
| 56 | 47.0 | 9.0 | 30.0 | 1.8 | 0.30 | 5.00 | 4.66 | — | — | — | — | — | — |
| 61 | 20.0 | 9.0 | 10.0 | 1.8 | 2.00 | 3.00 | 4.63 | — | — | — | — | — | — |

TABLE 2-continued

| Sample Number | Main Component (mol %) | | | Sub Component (wt %) | | | Sintered Density 900° C. | Curie Temperature | μ at 100 A/m | Q at 100 A/m | μ at 200 A/m | Q at 200 A/m | Lowering Rate of Q % |
|---|---|---|---|---|---|---|---|---|---|---|---|---|---|
| | Fe$_2$O$_3$ | CuO | ZnO | SiO$_2$ | Bi$_2$O$_3$ | Co$_3$O$_4$ | | | | | | | |
| 62 | 52.0 | 9.0 | 10.0 | 1.8 | 1.00 | 1.00 | 4.10 | — | — | — | — | — | — |
| 63 | 40.0 | 3.0 | 10.0 | 1.8 | 1.00 | 1.00 | 4.83 | — | — | — | — | — | — |
| 64 | 40.0 | 17.0 | 10.0 | 1.8 | 1.00 | 1.00 | 5.00 | ○ | 12 | 53 | 13 | 48 | 9 |
| 65 | 40.0 | 9.0 | 45.0 | 1.8 | 1.00 | 1.00 | 5.25 | X | — | — | — | — | — |

From Table 1 and Table 2, it was confirmed that lowering rates of Q were good when three kinds of SiO$_2$, Bi$_2$O$_3$ and Co$_3$O$_4$ as the sub component were included, and when the contents of the main component and the sub component were in a range of the present invention (sample numbers: 1 to 31). Further, with respect to samples whose μ was 80 or smaller, it was confirmed that Q values were 120 or larger under the external magnetic field of 100 A/m, and that Q values were 100 or larger under the external magnetic field of 200 A/m. On the other hand, when either the main component or the sub component was out of the range of the present invention (sample numbers: 41 to 65), sintered bodies whose any one or more of sintered density, Curie temperature, lowering rate of Q, and Q value was out of the excellent range were obtained.

Figure 3:
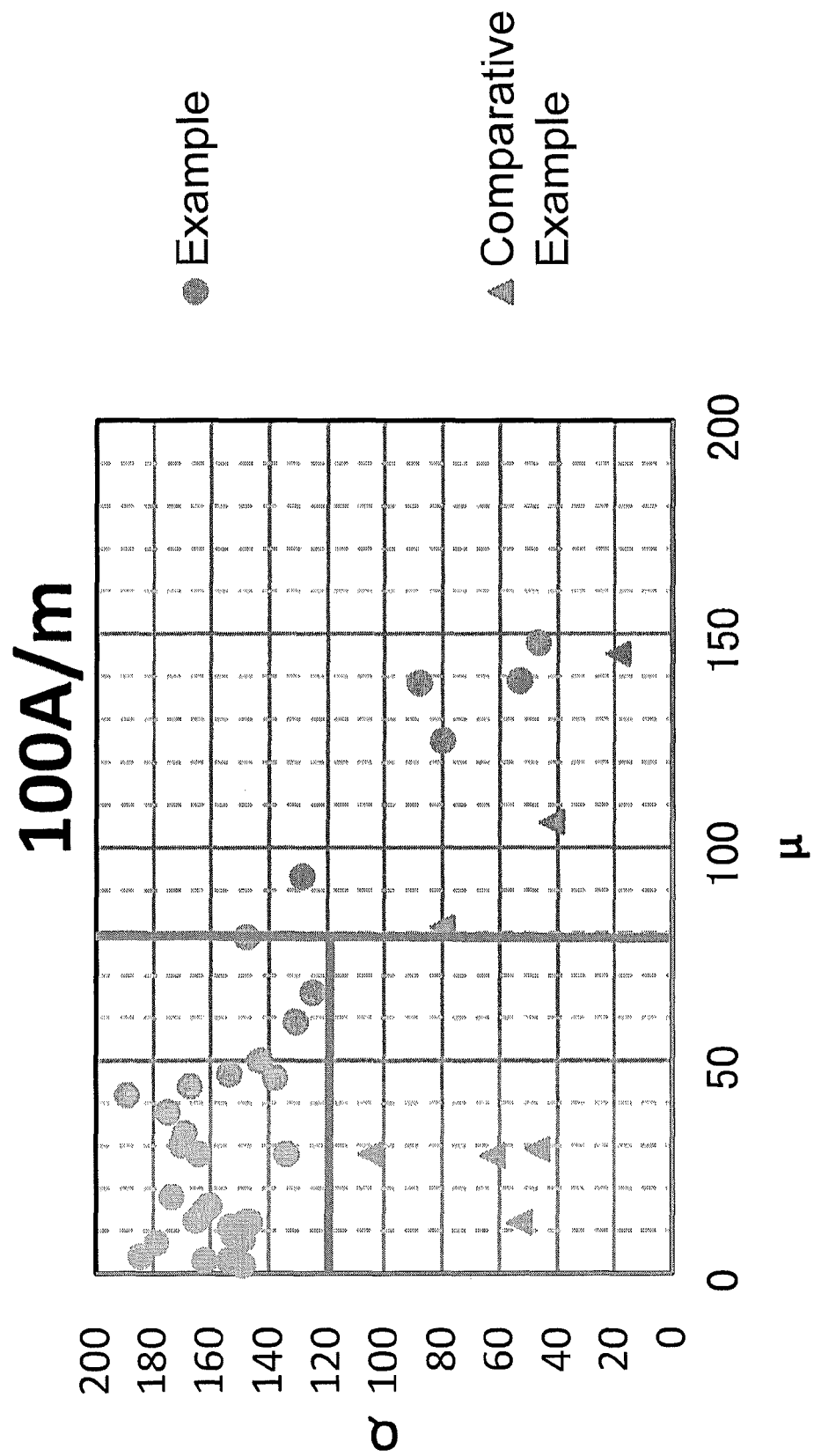
FIG. 3 is a graph showing a relation between μ and Q of each sample in an external magnetic field H=100 A/m.
Figure 4:
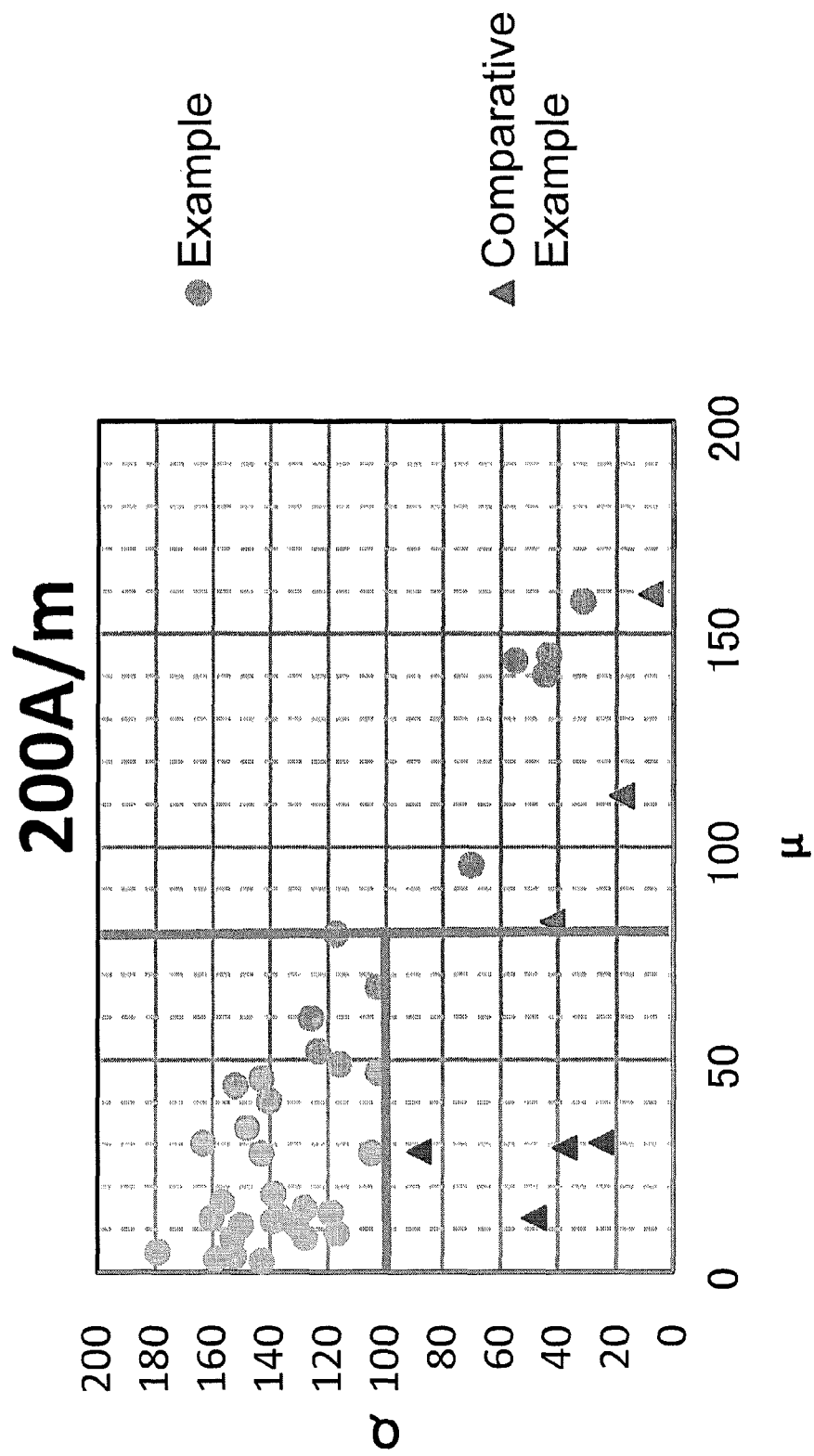
FIG. 4 is a graph showing a relation between μ and Q of each sample in an external magnetic field H=200 A/m.

Further, FIG. 3 (H=100 A/m) and FIG. 4 (H=200 A/m) represent that the results of Table 1 and Table 2 were graphed by every external magnetic field. According to FIG. 3 and FIG. 4, it is clear that Q values of Example are higher than those of Comparative Example when samples of Example and Comparative Example whose μ is close are compared.

Example 2

Figure 5:
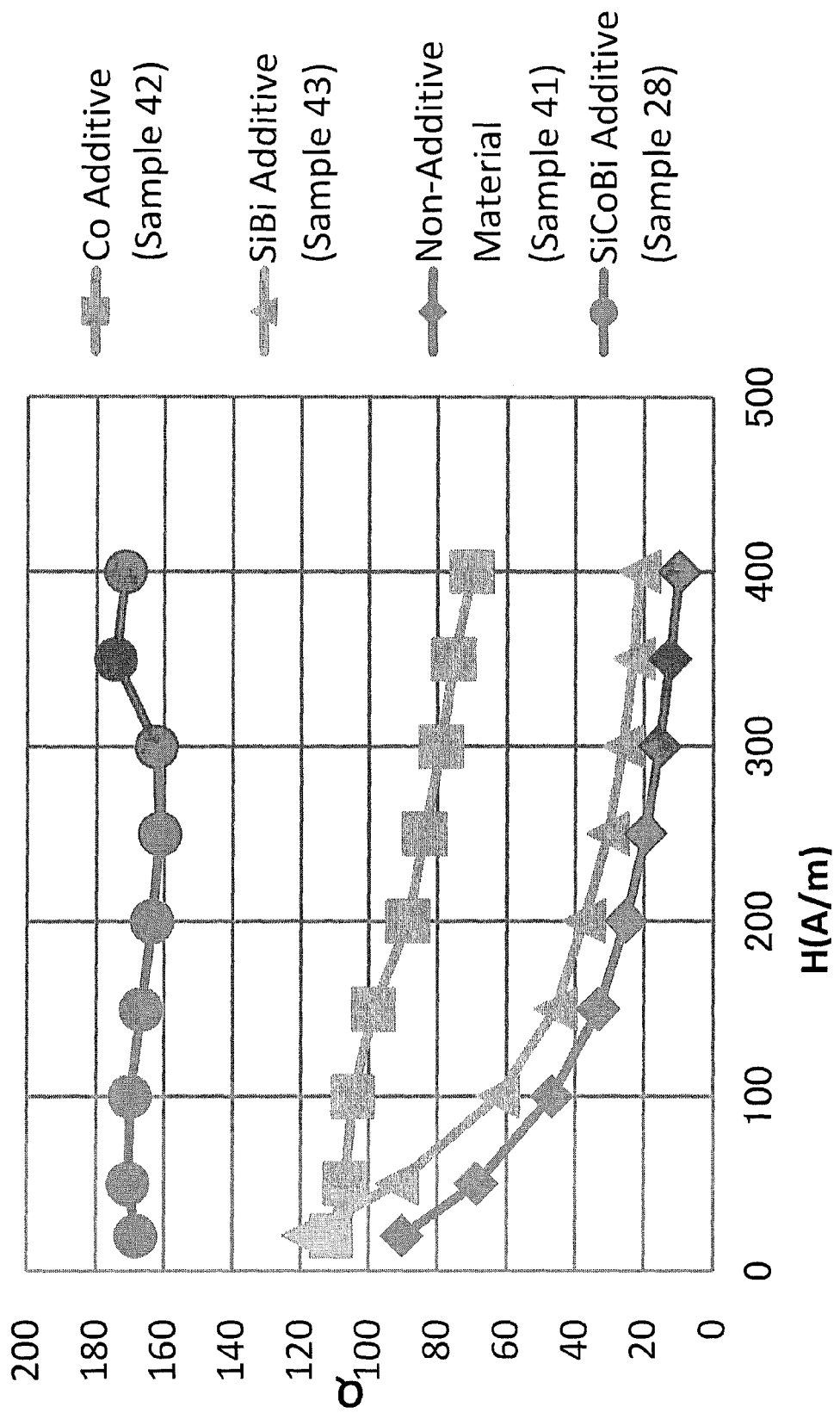
FIG. 5 is a graph showing variations of Q of each sample when an external magnetic field H varies.

With respect to sample number 28 of Table 1 and sample numbers 41 to 43 of Table 2, FIG. 5 was obtained by summarizing the results of Q values measured under an external magnetic field (H=20 to 400 A/m) except for H=100 A/m and H=200 A/m. Other factors other than the external magnetic field were measured in the same way as with Example 1. Note that, sample number 41 corresponds to a conventional non-additive material, sample number 42 corresponds to a conventional Co additive material, and sample number 43 corresponds to a conventional SiBi additive material.

From FIG. 5, it is understood that the SiCoBi additive material according to the present invention has a small lowering rate of Q during rising of the external magnetic field and can keep Q values high under the high magnetic fields of 20 to 400 A/m compared with the conventional non-additive material, Co additive material, and SiBi additive material.

Example 3

Figure 6C:
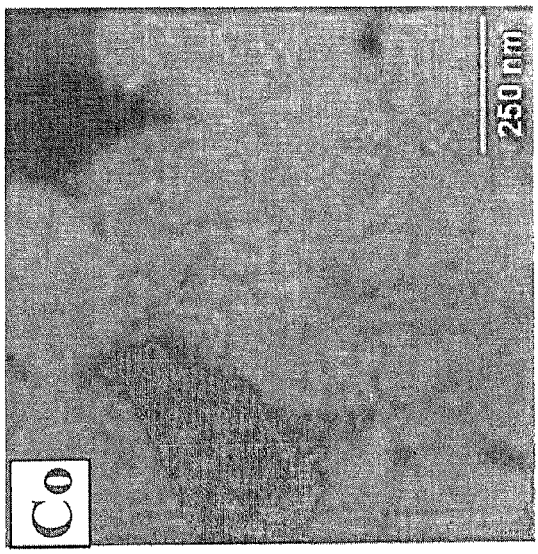
FIG. 6A to FIG. 6C are photographs showing concentration distributions regarding each of Bi, Si, and Co when the ferrite materials according to the example of the present invention are structurally analyzed.
Figure 6B:
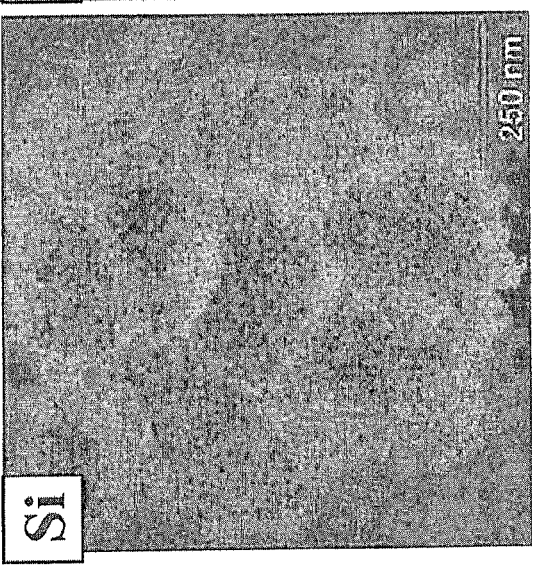
Figure 6A:
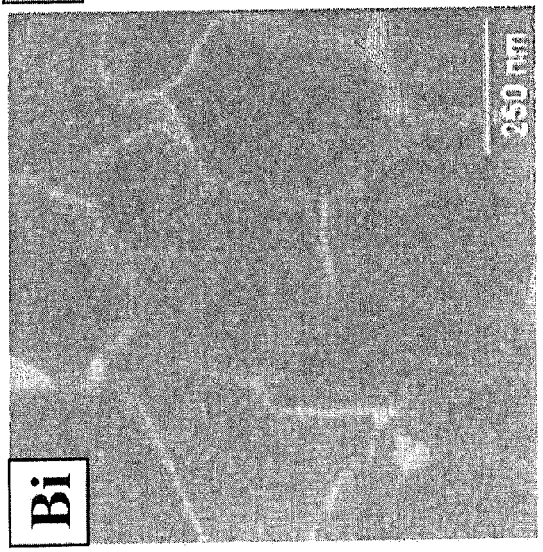

With respect to sample number 37 of Table 1, a structural analysis was performed by a method of EDX elemental mapping by using STEM HITACHI Ultra-thin Film Evaluation System HD-2000. The results were shown in FIG. 6A to FIG. 6C. FIG. 6A to FIG. 6C show concentration distributions of Bi, Si, and CO, respectively. The white areas are where concentrations of each of the elements are relatively high.

As shown in FIG. 6A to FIG. 6C, Si and Bi are segregated to cover ferrite particles in the ferrite materials according to the present invention. On the other hand, Co is comparatively uniformly present in the ferrite materials by dissolving to the ferrite particles in solid.

The reason why Q values under large amplitude currents of the ferrite materials according to the present invention improve is not clear. However, a synergistic effect where Si and Bi are segregated at the same area and Co is comparatively uniformly present is possibly considered as the reason.

As the above, the ferrite material according to the present invention can be sintered at a temperature lower than the melting point of Ag (962° C.). Further, the sintered body obtained by sintering the ferrite material according to the present invention at a low temperature has a high characteristic even under high electric currents. Therefore, by using the ferrite material according to the present invention, it is possible to obtain electronic components which can be downsized and further are effective for even large amplitude signals.

NUMERICAL REFERENCES

1 . . . multilayer inductor
2 . . . element
3 . . . terminal electrode
4 . . . multilayer body
5 . . . coil conductor
5a, 5b . . . leading electrode
10 . . . LC composite electronic component
12 . . . inductor part
14 . . . capacitor part

The invention claimed is:

1. A ferrite composition comprising a main component and a sub component, wherein
said main component is comprised of 25.0 to 45.0 mol % iron oxide in terms of Fe$_2$O$_3$, 7.0 to 11.0 mol % copper oxide in terms of CuO, 0 to 40.0 mol % zinc oxide in terms of ZnO, and a remaining part of nickel oxide,
said sub component includes 1.2 to 5.0 wt % silicon oxide in terms of SiO$_2$, 0.10 to 3.00 wt % bismuth oxide in terms of Bi$_2$O$_3$, and 0.10 to 3.00 wt % cobalt oxide in terms of Co$_3$O$_4$, with respect to the main component 100 wt %, and
permeability μ is 80 or less.

2. An electronic component comprising a ferrite sintered body composed of the ferrite composition according to claim 1.

3. The ferrite composition according to claim 1, wherein cobalt oxide in terms of Co$_3$O$_4$ is present in the sub component in an amount of 0.8 to 3.00 wt %.

4. The ferrite composition according to claim 1, further comprising ferrite particles and crystal grain boundaries among adjacent crystal particles, wherein an average crystal particle diameter of the crystal particles is 0.2 to 1.5 μm.

5. The ferrite composition according to claim 1, wherein bismuth oxide in terms of $Bi_2O_3$ is present in the sub component in an amount of at least 0.20 wt %.

6. A multilayer inductor comprising an element comprising:
   ferrite layers composed of the ferrite composition according to claim 1, and
   coil conductors made of Ag and formed three-dimensionally and spirally via the ferrite layers.

* * * * *